United States Patent Office 3,469,780
Patented Sept. 30, 1969

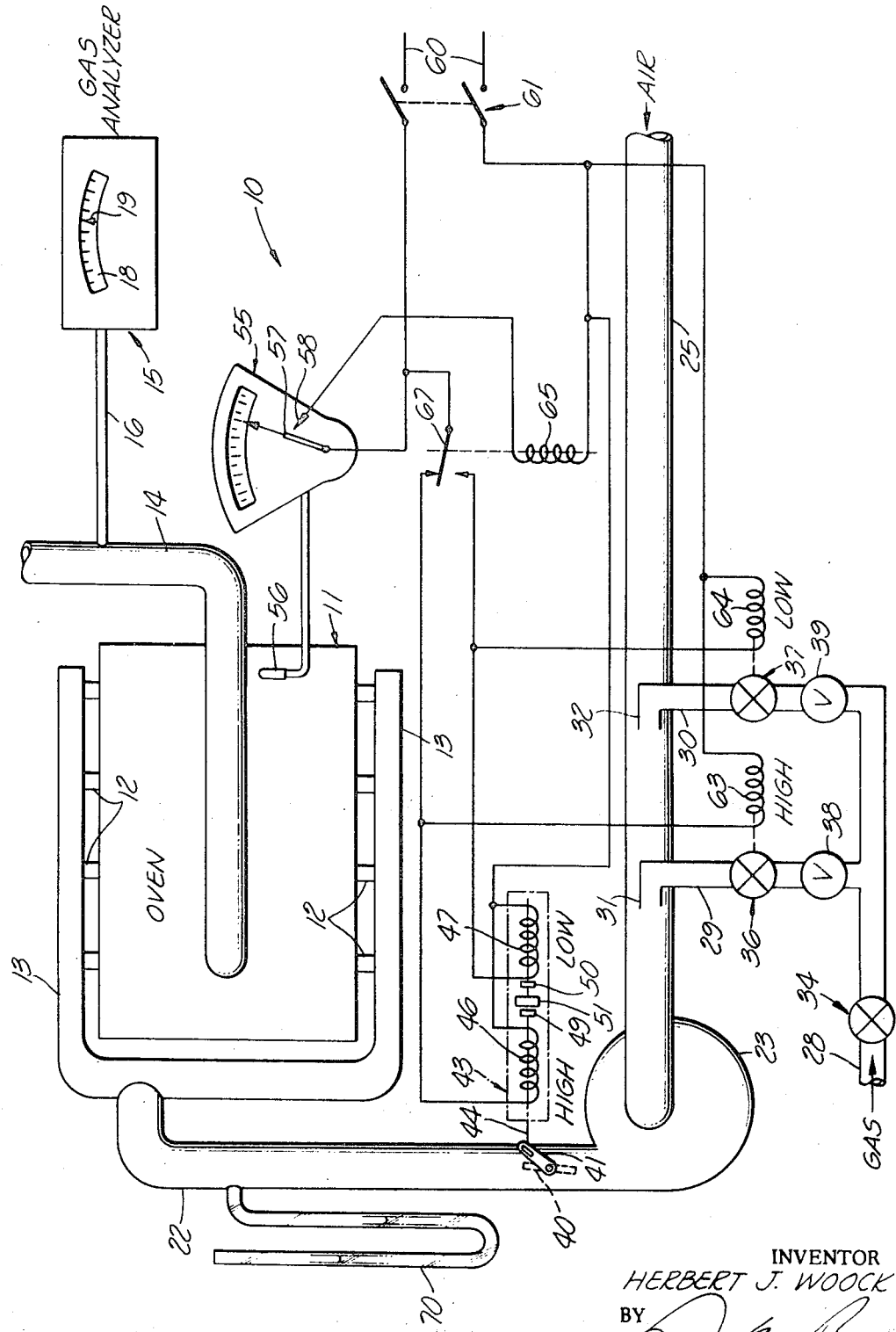

3,469,780
AUTOMATIC TEMPERATURE CONTROL
Herbert J. Woock, 420 California St.,
Arcadia, Calif. 91006
Filed Nov. 1, 1967, Ser. No. 679,718
Int. Cl. F23n 1/02; G05d 23/02
U.S. Cl. 236—15
10 Claims

ABSTRACT OF THE DISCLOSURE

A system for maintaining a chamber heated to a desired temperature level by supplying burner means alternately with combustible mixtures at two different rates one of which is adequate to supply heat in excess of furnace losses and the other of which is inadequate to supply heat losses and including control means for shifting between the two supply rates as the furnace temperature reaches a desired temperature level and again as the furnace temperature recedes from this temperature level. Combustion air is supplied by a constant speed blower having its suction inlet in communication with a fuel supply source. A flow regulator, positioned in the discharge side of the blower means, operates between two partially open positions to supply the combustible mixture at two different rates.

---

This invention relates to automatic temperature controls for furnaces and other applications and more particularly to an improved greatly simplified method and means for maintaining the temperature in a heated chamber substantially constant.

There are countless applications in industry, the laboratory and elsewhere having need for heating equipment and controls therefor capable of maintaining a furnace or a heated chamber at a desired temperature level with accuracy and reliability and requiring a minimum of attention and surveillance. Among the many typical examples may be mentioned furnaces heated by gaseous fuel supplied from any convenient source. The problem is particularly troublesome in applications subject to abrupt changes in the heat load, as, for example, in applications where the load in the furnace is withdrawn or a new cold load is introduced or a hot load in the furnace is replaced by a cold load. These and the like changes in operating conditions subjects the furnace and the temperature control system to severe requirements difficult to cope with and to counteract. A wide variety of temperature regulating systems have been proposed heretofore dealing with these problems and involving control of the flow and relative quantities of fuel and air to the heating burners in response to changes in temperature in the heated chamber in an effort to maintain a desired temperature despite wide range changes in the operating conditions. However, all such control systems are found to be subject to serious disadvantages and shortcomings all of which are avoided by the present invention using simple, inexpensive and highly reliable components.

This invention contemplates using suction blower means having its suction side connected to the atmosphere and to a source of gaseous fuel and its discharge connected to either a single or a plurality of burners. The blower means preferably operates at a constant speed, its discharge side being equipped with throttling means operating to supply a combustible mixture selectively at different rates under the control of sensitive temperature sensing means in the space being heated. According to one preferred arrangement of the invention control, the higher rate combustible mixture is effective to heat the space quickly to a temperature in excess of the heat losses from the space whereas the lower rate combustible mixture is inadequate to supply the heat losses. The system operates automatically to supply the combustible mixture at the higher rate until the selected temperature is achieved whereupon the system automatically shifts to supply the combustible mixture at the lower rate until the temperature sensing means senses a recession from the selected temperature whereupon the system resumes supply of the combustible mixture at the higher rate.

To avoid the serious problems heretofore encountered in mixing gaseous fuel and air under differing flow rates and pressures, the present invention utilizes blower means having its discharge connected directly with the furnace burners and its suction inlet connected to the atmosphere. The gaseous fuel is introduced into the air on the suction side of the blower. Additionally, and importantly the air and gas are thoroughly intermixed under the highly effective mixing conditions prevailing within the blower means which operates at constant speed. Control over the flow rate of combustible mixture to the burners is provided by regulating valve means on the discharge side of the blower and normally held in either its high or in its low rate position depending upon the heating demand and whether the fuel supply is operating at the high or the low rate. A continuous type gas analyzer is connected to the flue and permits the operator to determine at a glance whether there is either excess or inadequate oxygen for optimum operation for the particular use being made of the equipment. Simple, easily made adjustments can then be made, if necessary, in the gas supply until the gas analyzer indicates high efficiency combustion conditions for that use.

Accordingly, it is a primary object of the present invention to provide an exceedingly simple, reliable method and apparatus for utilizing a combustible mixture to maintain a space chamber, furnace or the like heated to a desired temperature level.

Another object of the invention is the provision of a fast acting highly reliable automatic temperature control system for furnaces and the like capable of compensating for wide range and abruptly applied changes in heat load.

Another object of the invention is the provision of automatic control means for fuel burners used to maintain a chamber heated to a desired temperature level and operating at a first rate in excess of heat losses and at a second rate less than the heat losses therefrom and including control means for switching between the two rates as the chamber temperature reaches and then recedes from a desired temperature level.

Another object of the invention is the provision of means for supplying a gaseous fuel mixture to burner means and including suction blower means having its inlet connected to a gaseous fuel source and to an atmospheric air source and utilizing the blower to mix the gas and air intimately while passing therethrough.

Another object of the invention is the provision of an automatic temperature control system employing a blower operating at uniform speed having means for regulating the flow discharging therefrom and having its suction air inlet connected to a source of pressurized gaseous fuel.

These and other more specific objects will appear upon reading the following specification and claims and upon considering in connection therewith the attached drawing to which they relate.

Referring now to the drawing in which a preferred embodiment of the invention is illustrated.

The single view of the drawing is a schematic representation of the invention temperature control arranged to supply fuel to multiple burners heating an oven.

Referring to the drawing, there is schematically represented one preferred embodiment of the invention temperature control system designated generally 10 as employed to heat an oven or furnace 11. By way of example, let it be assumed that it is desired to maintain the space within this oven at a temperature of 2050 degrees F. to fuse a layer of hardfacing to a metallic article of manufacture. In this and numerous like operations it is most important that the temperature within the heated chamber be held as precisely as is possible to a selected value since a temperature in excess of the selected value results in softening of the article being coated to an undesirable degree, warpage and other undesirable effects whereas temperatures below the critical temperatures necessary for fusion of the coating and the base metal will result in failure. In either event, an imperfect result is produced and the article must be rejected. Additionally, the attainment of uniform and effective results is dependent upon maintaining atmospheric conditions within the oven as constant as possible.

It will be understood that oven 11 is of the type having a multiplicity of suitable burners mounted in its walls. Only the positions of a few of the burners is indicated schematically in the drawing, the inner ends of these burners opening into the interior of the oven chamber and their outer ends being supplied with a combustible mixture via supply pipes 12 in communication with a manifold 13. The products of combustion discharge to the atmospheric from the oven through a flue 14. A continuous gas analyzer 15 has a probe connected to the flue via conduit 16 and is provided with a scale 18 cooperating with a pointer 19 to indicate to the observer the excess oxygen constituent of the furnace atmosphere. This information suffices to inform the observer whether the gas and air ratio is properly balanced to provide the most favorable atmosphere and/or the most efficient combustion for the particular operation being carried out with the furnace and the described temperature control system.

The combustible mixture is supplied to the manifold 13 via a duct 22 in communication with the outlet of centrifugal or the like blower means 23 driven by a motor, not shown. Opening into the suction side of blower means 23 is a duct 25 in communication with a clean supply of atmospheric air.

Fuel gas is introduced into inlet air duct 25 from a supply main 28 via ducts 29, 30 arranged in parallel with one another and each having an outlet 31, 32 discharging axially downstream of duct 25. Supply conduit 28 is provided with a master cut-off valve 34 which is fully open so long as the system is in operation. Branch ducts 29, 30 are provided with respective solenoid operated valves 36, 37 designed to close under spring pressure or gravity when de-energized. On the supply side of these valves is an associated manually adjustable regulating valve 38, 39 by which the flow rate can be finely regulated, it being understood that solenoid valves 36, 37 perform no flow regulating function but, when open, merely freely passing gas flowing past regulating valves 38, 39.

The means for regulating the rate at combustible mixture flow discharging from blower 23 is here shown as comprising a butterfly valve 40 mounted crosswise of duct 22 and movable between its operating positions by an operating arm 41 having a lost motion connection with one end of a motor represented generally at 43. It will be understood that any suitable operator may be employed to move valve 40 between its two operating positions in one of which the combustible mixture is supplied to the burners at a high rate and in the other of which it is supplied at a substantially lower rate.

By way of example, operator 43 may comprise a hydraulic cylinder movable between a selected pair of operating positions under the control of electrically controlled valve means well known to those skilled in this art. Alternatively and as herein shown, operator 43 comprises a two-position solenoid having an armature 44 operatively connected to arm 41 and movable to and fro between its two stationary positions depending upon which of coils 46, 47 is energized. The support for armature 44 is provided with a pair of separately adjustable stops 49, 50 positioned on the opposite sides of an enlargement 51 fixed to the armature and cooperating therewith to limit the travel of the armature in each direction. As shown in the drawing, coil 46 is energized with the result that armature 44 is shifted to the left until its enlargement 51 abuts stop 49. In this position, the butterfly valve 40 is positioned to supply the combustible mixture to the burner at a high rate. When coil 47 is energized armature 44 is shifted to the right rotating valve 40 clockwise to restrict the combustible mixture flow to the low rate.

Control of the operation of solenoid means 43 is initiated by a pyrometer 55 having a temperature sensor 56 within the oven and connected to energize the pyrometer in a well known manner. The pyrometer may be provided with either a single or a double pair of contacts arranged to complete an electrical circuit to the gas valves and to operator 43 as the temperature attains and recedes from a selected value. As here shown, the pyrometer has a single adjustable contact 58 positioned to be contacted by the pyrometer pointer 57, when the oven chamber reaches a selected temperature level, such as 2050 degrees F.

The control circuit is energized from a power supply 60 through a master switch 61, one side of the line being connected to the pyrometer pointer and the other to coils 63, 64 of solenoid valve 36, 37. The pyrometer contact is connected in circuit with a power relay 65 which, when de-energized, has its contact 67 closed in the position shown in the drawing. When energized the relay closes downwardly and energizes coils 47 and 64.

Operation of the described temperature control system is as follows, it being pointed out that the furnace is preferably provided with a pilot burner, not shown. To start the system in operation, switch 61 is closed and the blower motor, not shown, comes up to speed. Thereafter, master gas valve 34 is opened and, the furnace being cold, power relay contact 67 will be closed upwardly as shown, butterfly valve 40 will be in its high position and solenoid valve 63 will be energized and in open position. Accordingly, blower 23 will induce a flow of gas and air under subatmospheric pressure into the blower inlet where these components are thoroughly intermixed before entering duct 22 for flow through manifold 13 to the burners where the gas mixture is ignited by the pilots and burns to supply heat to the oven.

The operator observes the air pressure prevailing in the mixture supply duct 22 by reading manometer 70 and closely observes gas analyzer 15 to determine whether the desired air-gas combustion mixture is being supplied to the burners and whether complete combustion of the fuel is taking place. If the combustion is occurring at high efficiency for a hard-facing operation, the gas analyzer should indicate a $CO_2$ oxidizing content in the flue gas of approximately ten percent. If there is a different reading then the operator adjusts gas regulator valve 38 in the proper direction and as necessary to correct the undesirable condition.

When the oven temperature reaches the selected limit, pointer 57 of the pyrometer engages contact 58 thereby energizing relay 65 and closing its contact 67 downwardly to energize only coils 47 and 64. Solenoid gas valve 36 then closes as valve 37 opens. The energization of coil 47 shifts butterfly valve 40 to partially close the latter and reduce the flow of the combustible mixture to the burners. The operator then carefully observes the gas analyzer to make certain that the desired atmosphere is present in the oven at the lower heating rate. If is it not, then adjustments are made in valve 39 until the desired atmosphere prevails in the oven.

The burning of the combustible mixture supplied at the lower rate just described is preferably inadequate to counteract normal heat losses from the oven with the result that after a brief period of operation at this lower rate, the oven temperature will fall. A drop of 10 or 15 degrees F. is adequate to move the pyrometer pointer 57 away from contact 58 thereby opening the circuit to power relay 65. Instantly this occurs, coils 47, 64 are deenergized and coils 46, 63 are energized thereby restoring the supply of the combustible mixture to burners at the high rate. If the control system is being used to control a furnace or other appliance subject to large or sudden changes in the heat load as, for example, a furnace opened periodically to discharge hot goods and to receive cold goods, it is desirable to supply the combustible mixture at a high rate sufficiently adequate to restore the furnace operating temperature quickly and then to reduce the heating rate sufficiently to avoid overshoot. This is accomplished by supplying the combustible mixture at a low rate incapable of counteracting heat losses. In practice, typically, the low rate can be selected within the range of 5 to 70 percent of the high rate.

The described control system continues to operate in this manner and is highly effective in maintaining the oven temperature and atmosphere substantially constant utilizing a minimum number of simple rugged components. If the heat load changes abruptly, the temperature control responds quickly and smoothly to the changed conditions with a minimum temperature change and without risk of the temperature rising above the selected value. A minimum of attention and surveillance is required of an operator. It will also be understood that the position of the pyrometer contact 58 may be readily changed to any position within the operating range of the pyrometer and the associated equipment.

Resetting the control to operate the furnace chamber with a different atmosphere merely involves adjusting the fuel valves and noting the change in the oxygen content of the flue gas. In this connection it is, of course, important to adjust each of the valves 38, 39 until the same furnace chamber atmosphere is present at each combustion rate and then locking the controls in the corrected adjusted position.

While the particular automatic temperature control herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. An automatic temperature control for a furnace equipped with burner means comprising blower means operating continuously at substantially uniform speed for supplying combustion air to the furnace burner means, air flow regulator means for said blower means operable to supply air to said burner means selectively at a low rate and at a high rate, means for automatically supplying a substantially uninterrupted stream of fuel gas into the suction side of said blower means selectively at one of two rates so adjusted relative to a respective one of said flow rates as to provide a high efficiency combustible mixture to said burner means at each of said air flow rates, and control means responsive to the temperature in the furnace for operating said air flow regulator means and said fuel gas supply means in unison at their respective high rates until the furnace reaches a desired high temperature and then at their respective low rates before resuming operation at said high rate thereby to maintain the furnace temperature substantially at a desired operating value.

2. An automatic temperature control as defined in claim 1 characterized in that said air flow regulator means includes air damper means on the discharge side of said blower means having means for supporting the same for movement between two different partially open positions, and adjustable means for separately varying each of said open positions independently of the other.

3. An automatic temperature control as defined in claim 1 characterized in that said means for supplying fuel gas into the suction side of said blower means includes separately operated control valves connected in parallel between a fuel gas supply and the suction side of said blower means and each being movable between an open and a closed position, and separate means for regulating the gas flow occurring past each of said control valves when in open position.

4. An automatic temperature control as defined in claim 3 characterized in that said means responsive to furnace temperature includes means for reversing the positions of said gas valves substantially simultaneously and whereby one opens as the other closes thereby to maintain a substantially continuous flow of fuel gas into the upstream side of said blower means.

5. An automatic temperature control for a furnace as defined in claim 3 characterized in that said separate means for controlling the flow of fuel gas in said parallel gas connections includes separately adjustable needle valve means on the inlet side of each of said two-position gas flow control valves, said needle valves being manually adjustable to regulate the gas flow rate found necessary for optimum furnace operation.

6. That method of operating a furnace substantially at a uniform temperature level which comprises: utilizing suction type centrifugal blower means to produce a stream of combustion air discharging into burner means for the furnace, supplying a substantially uninterrupted stream of fuel gas into said air stream on the suction side of said blower means selectively and alternately at a high rate and at a low rate, intimately mixing said air and fuel gas as the same pass through said blower means enroute to said burner means, regulating they flow rate of air through said blower means selectively at a high rate and a low rate coordinated respectively with said high rate and said low rate of gas flow and effective to provide in each of said positions the proper quantity of air for high efficiency combustion of the fuel gas, operating the furnace burner means at said high rate of fuel gas and air until the furnace temperature reaches a predetermined temperature and then shifting abruptly to said low rate of fuel gas and air supply until the furnace temperature drops a few degrees and thereupon automatically resuming the supply of fuel gas and air at said high rate thereby to maintain the furnace temperature substantially at said predetermined temperature.

7. An automatic temperature control for a furnace equipped with burner means comprising: means including centrifugal blower means operating continuously at uniform speed for supplying a pressurized combustible mixture to said burner means, first means for providing a flow of fuel and air into said blower means for intimate intermixing within said blower means to provide a first combustible mixture at a flow rate adequate to heat the furnace to a temperature in excess of a desired temperature, second means for providing a flow of fuel and air into said blower for intimate intermixing within said blower means to provide a second combustible mixture at a flow rate inadequate to maintain the furnace heated to said desired temperature, and means responsive to the temperature in the furnace and operatively connected to said first and said second means for selectively supplying said first and said second combustible mixtures to said furnace automatically in alternation to maintain continuous combustion in the furnace as the furnace temperature reaches and then recedes from said desired furnace temperature thereby to maintain the furnace temperature substantially constant within close limits.

8. That method of operating a furnace equipped with gaseous fuel burner means to maintain the same substantially at a desired temperature within closely spaced limits which method comprises: utilizing constant speed air blower means to intermix gaseous fuel and air selectively to continuously provide either a first or a second highly efficient combustible mixture for said burner means, delivering one only of said combustible mixtures to said burner means so long as the furnace is in operation, said first combustible mixture being effective to heat said furnace to a desired temperature and said second combustible mixture being ineffective to supply heat losses and to maintain the furnace at said desired temperature, and shifting between said first and second combustible mixtures as the furnace temperature reaches and recedes from said desired temperature.

9. That method of operating a furnace defined in claim 8 characterized in delivering said gaseous fuel into air flowing to said constant speed blower means under subatmospheric pressure.

10. That method of operating a furnace defined in claim 9 characterized in that said step of shifting between said first and second combustible mixtures is performed on the discharge side of said blower means by throttling the flow of the combustible mixture permitted to discharge from said constant speed blower means.

References Cited
UNITED STATES PATENTS

| | | | |
|---|---|---|---|
| 2,335,471 | 11/1943 | Ashcraft | 431—59 |
| 2,517,869 | 8/1950 | Grapp | 236—15 X |

WILLIAM E. WAYNER, Primary Examiner

U.S. Cl. X.R.

236—78; 263—52